(12) United States Patent
Oyama

(10) Patent No.: US 8,231,079 B2
(45) Date of Patent: Jul. 31, 2012

(54) AERODYNAMIC BRAKING DEVICE FOR AIRCRAFT

(75) Inventor: Hiroki Oyama, Summerfield, NC (US)

(73) Assignee: Honda Patents & Technologies North America, LLC, Torrance, CA (US)

( * ) Notice: Subject to any disclaimer, the term of this patent is extended or adjusted under 35 U.S.C. 154(b) by 594 days.

(21) Appl. No.: 12/415,088

(22) Filed: Mar. 31, 2009

(65) Prior Publication Data
US 2009/0242698 A1    Oct. 1, 2009

Related U.S. Application Data

(60) Provisional application No. 61/040,869, filed on Mar. 31, 2008.

(51) Int. Cl.
*B64D 17/80* (2006.01)
(52) U.S. Cl. ............... 244/113; 244/110 A; 244/110 B
(58) Field of Classification Search ............... 244/113, 244/110 A, 110 B; 60/226.2; 239/265.19, 239/265.27, 265.31, 265.33
See application file for complete search history.

(56) References Cited

U.S. PATENT DOCUMENTS

| | | | |
|---|---|---|---|
| 2,254,591 A | 9/1941 | Dornier | |
| 2,421,870 A * | 6/1947 | Dornier et al. | 244/113 |
| 3,118,636 A * | 1/1964 | Kantrowitz et al. | 244/159.1 |
| 3,848,831 A | 11/1974 | Geary | |
| 3,942,746 A | 3/1976 | Carter et al. | |
| 4,003,533 A | 1/1977 | Carter et al. | |
| 4,004,755 A | 1/1977 | Hooper | |
| 4,040,580 A | 8/1977 | Schwaerzler | |
| 4,165,849 A | 8/1979 | Fox | |
| 4,372,507 A | 2/1983 | Denniston | |
| 4,566,657 A | 1/1986 | Grow | |
| 4,955,958 A | 9/1990 | Dellinger et al. | |
| 5,048,773 A | 9/1991 | Washington et al. | |
| 5,735,485 A | 4/1998 | Ciprian et al. | |
| 5,769,362 A | 6/1998 | Greene et al. | |
| 6,491,261 B1 | 12/2002 | Blake | |
| 6,817,278 B2 | 11/2004 | Hennemann et al. | |

FOREIGN PATENT DOCUMENTS

| | | |
|---|---|---|
| CH | 658231 | 10/1986 |
| GB | 1349739 | 4/1974 |
| WO | 2004/108526 | 12/2004 |

* cited by examiner

*Primary Examiner* — Timothy D Collins
*Assistant Examiner* — Jamie S Stehle
(74) *Attorney, Agent, or Firm* — Rankin Hill & Clark LLP

(57) ABSTRACT

A speed brake apparatus reduces the airspeed of an aircraft by increasing aerodynamic drag. First and second brake panels are located on opposite sides of a portion of the aircraft, such as the fuselage, and are adapted to swing outward about a downstream hinge axis into deployed positions extending into the air stream. The panels are controlled by an operating device that includes a linear actuator. The actuator moves an operating head connected to a pair of toggle assemblies to convert linear movement of the operating head to the deployment and retraction movement of the brake panels.

17 Claims, 6 Drawing Sheets

AERODYNAMIC BRAKING DEVICE FOR AIRCRAFT

FIELD OF THE INVENTION

The present invention relates to the in-flight control of aircraft and, more particularly, to aerodynamic brakes for reducing airspeed.

BACKGROUND

The design of in-flight control systems for modern high speed aircraft, particularly jet aircraft, may require deployment of one or more braking panels into the air stream to increase drag and reduce airspeed. Aerodynamic braking is particularly important in a rapid descent or to increase the angle of approach without increasing the aircraft speed. Braking panels may also, under some circumstances, be deployed just after touchdown to slow the aircraft initially to the point where wheel brakes can be safely applied.

Conventionally, brake panels are hingedly secured to the fuselage at their upstream end and pivotally open rearwardly. As such, a relatively large deployment force is required to move conventional speed brake panels into the air stream against the drag load. Usually, a fluid actuator of considerable capacity is used for this purpose. It will be appreciated that this type of operating system is inherently heavy and adds undesirable weight to the aircraft.

Accordingly, there is a need in the art for an aerodynamic speed brake for an aircraft that requires relatively small forces to deploy and retract, and that reduces the loads applied to the fuselage.

SUMMARY

In accordance with the present invention, there is provided an improved dynamic speed brake arrangement that requires significantly less operating force for deployment, and thus reduces power requirements, weight, and stress loads as compared with known speed brake mechanisms.

According to one embodiment, the device includes a pair of speed brake panels mounted on opposite sides of a portion of the aircraft, such as the fuselage. The panels are normally located in a retracted position and are formed to match the shape of adjacent portions of the aircraft. When activated, the panels swing outwardly to deployed positions in which they extend into the air stream and increase aerodynamic drag.

According to one embodiment, the operating mechanism for deploying and retracting the brake panels includes a linear actuator secured to the frame of the fuselage and an operating head that is moved by the actuator in a linear path generally parallel to the axis of the fuselage. The brake panels are operatively connected to the operating head so that as the actuating head is moved linearly from a downstream rest position to an upstream actuating position, the panels swing outwardly in opposite directions to their respective extended or deployed positions.

Deployment and retraction of the brake panels in response to linear movement of the operating head is achieved by operation of a pair of toggle assemblies. Each toggle assembly includes a control link pivotally connected at one end to a fixed support bracket and a carrier link pivotally connected between the other end of the control link and the operating head. Thus, linear forward movement of the operating head causes the toggle assemblies to retract so as to expand outwardly in opposite directions and move the panels toward an outward, deployed position. The aft portion of the fuselage is provided with a pair of openings on opposite sides. Portions of the toggle assemblies project through the openings during deployment of the panels.

In further accordance with the present invention, the lengths of the toggle assembly links, and the positions of the connections to the brake panel and the support structure relative to the aerodynamic center of the brake panels are selected so as to minimize a force required to deploy and retract the brake panels.

BRIEF DESCRIPTION OF THE DRAWINGS

These and further features of the invention will be apparent with reference to the following figures, wherein.

DETAILED DESCRIPTION

Figure 1:
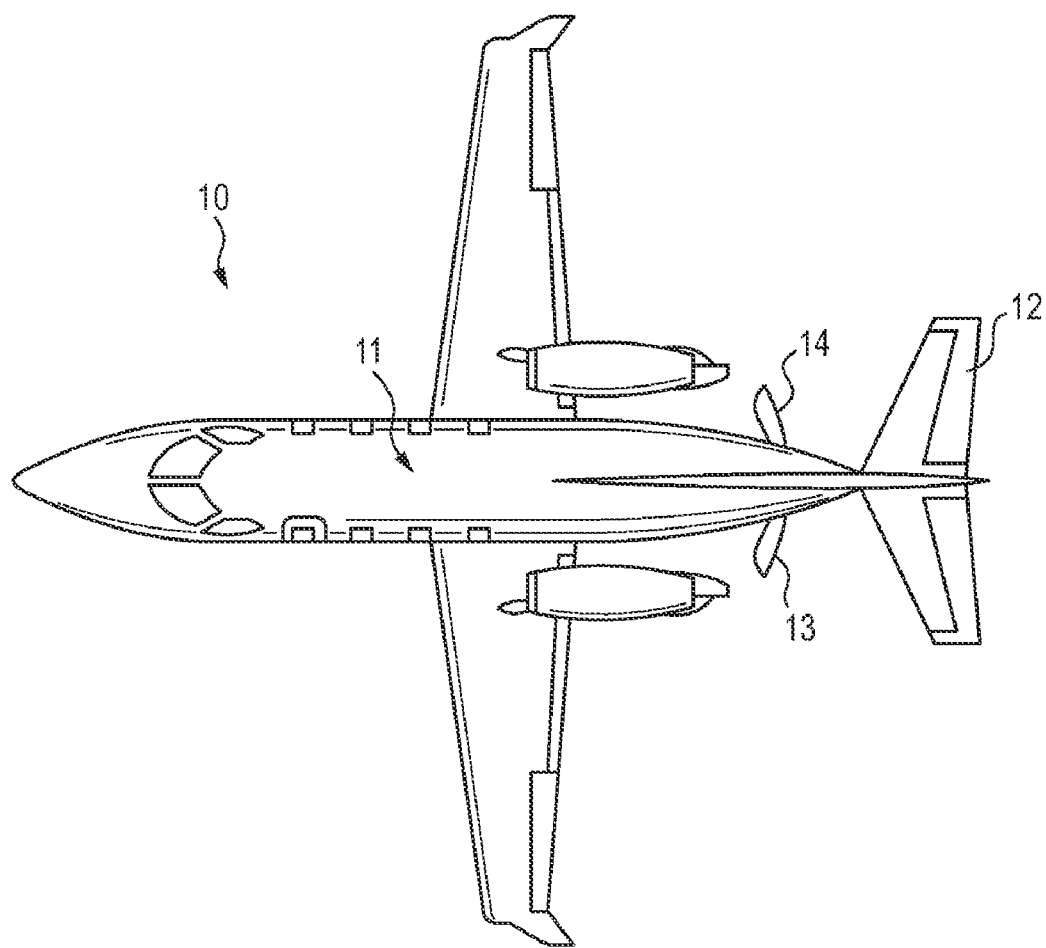
FIG. 1 is a plan view of a twin-engine jet aircraft having a speed brake arrangement embodying the invention and showing the speed brake panels in their deployed positions.
Figure 2:
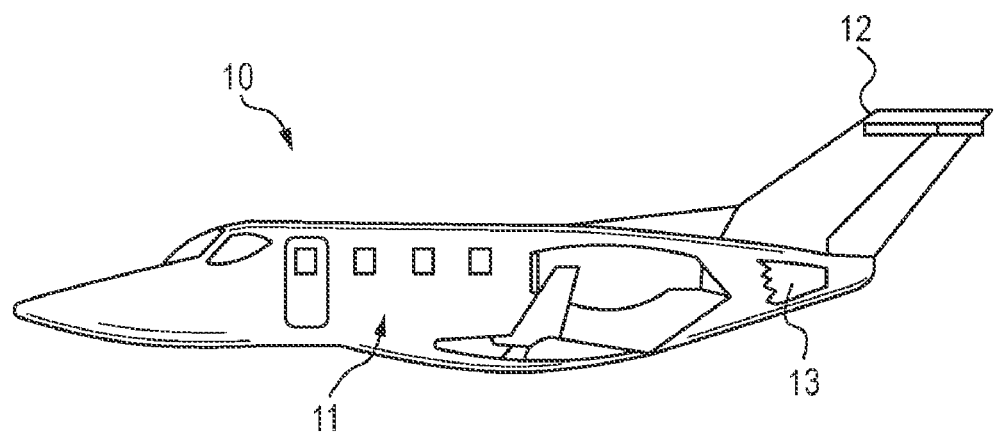
FIG. 2 is a side elevation of the aircraft of FIG. 1 showing the port side speed brake panel in its retracted position.

Referring more particularly to the drawings and initially to FIGS. 1 and 2, there is shown a twin engine jet aircraft 10 of the type designed to carry four or five passengers in addition to a crew of two. The aircraft has a fuselage 11 and a conventional empennage 12.

In accordance with an exemplary embodiment of the invention, two speed brake panels 13, 14 are provided on opposite sides of the aft portion of the fuselage 11 below the empennage 12. The panels are adapted to swing outwardly from a retracted or normal position shown in FIGS. 2, 4, and 5A, to partially or fully deployed positions shown in FIGS. 1, 3, 5B, and 5C.

In their retracted positions, the brake panels 13, 14, conform generally to the shape of the adjacent portions of the fuselage 11 so that the streamlined shape of the aircraft 10 is not interrupted. When the brake panels 13, 14 are partially or fully deployed they project outward into the air stream to produce additional aerodynamic drag and reduce airspeed.

Figure 3A:
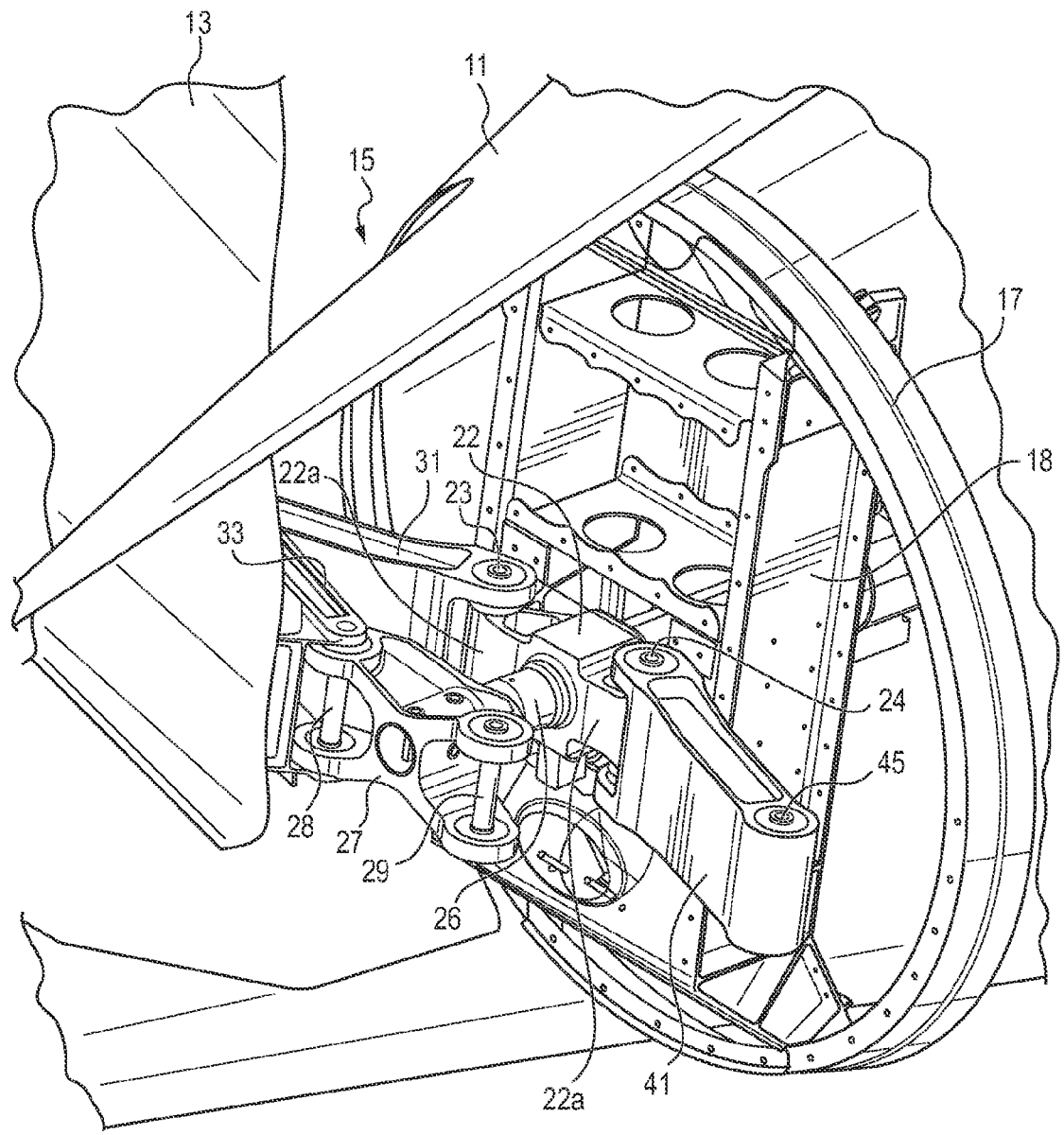
FIG. 3A is a fragmentary perspective view of the aft portion of the fuselage of the aircraft of FIGS. 1 and 2 with parts broken away for the purpose of illustration and showing the port side speed brake panel in its deployed position.
Figure 4:
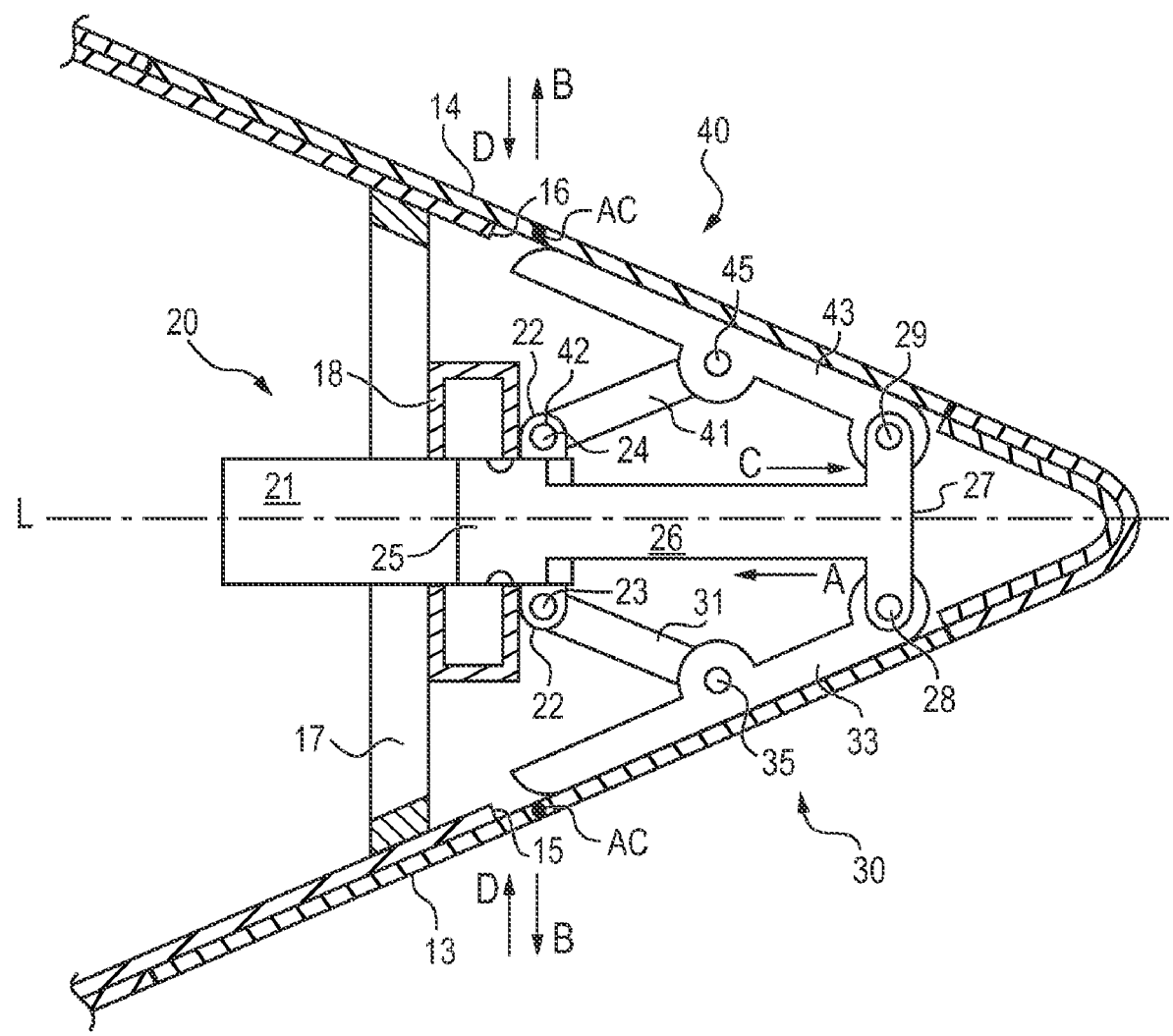
FIG. 4 is a fragmentary plan view of the aft fuselage portion of the aircraft of FIGS. 1, 2, 3A and 3B with parts broken away and illustrating a speed brake operating mechanism according to an exemplary embodiment of the invention with the speed brake panels in their retracted positions.

Openings 15, 16 are formed in the aft portion of the fuselage on opposite sides as shown in FIGS. 3A and 4. The openings 15, 16 are covered by the respective brake panels 13, 14 when in their retracted positions and are exposed when the panels 13, 14 are deployed to permit the operating mechanism to extend outwardly through the openings 15, 16 as shown in FIGS. 5B and 5C. During deployment, the upstream end portions of the brake panels 13, 14 swing outward and the downstream ends move upstream and somewhat inward through the openings 15, 16.

A frame of the fuselage has a ring-shaped structural member 17 near the aft portion thereof. A vertically oriented bracket 18 is secured to the member 17 to provide a support for a control mechanism that operates the brake panels 13, 14. The orientation and structural features of the illustrated bracket 18 and structural member 17 are normally specific to the particular aircraft, and should not be considered as limiting the scope of the present invention, as various alternative support configurations are contemplated and considered to be functional alternatives.

The control mechanism includes a linear actuator 20 with a fluid cylinder 21 and a piston 25. The cylinder 21 has a mounting member 22 at its rearward or downstream end that serves to simultaneously connect the cylinder 21 and a control link 31, 41 of a pair of toggle assemblies 30, 40, respectively, to the bracket 18. Attaching the cylinder 21 and toggle assemblies 30, 40 to the bracket 18 via a single mounting member 22 saves space and reduces weight. The mounting member 22 has a pair of ears 22a that extend laterally, with each of the ears 22a defining journals that form part of a pair of fixed hinge joints 23, 24.

The piston 25 includes a piston rod 26 and the operating head 27, with the operating head being disposed at a distal or free end of the piston rod 26, as shown in FIG. 4. The operating head 27 has a pair of journals on opposite sides that form part of a pair of hinge joints 28, 29 that move with the piston head 27 during linear movement of the piston head 27.

The first and second toggle assemblies 30, 40, best shown in FIG. 4, that are interconnected in opposed relation so as to extend in opposite directions in response to linear movement of the piston 25 and the associated operating head 27.

In addition to the control link 31, the first toggle assembly 30 also includes a carrier link 33. A first end of the control link 31 is pivotally connected to the mounting member 22 at the fixed hinge joint 23. A second or opposite end of the control link 31 is pivotally connected to the carrier link 33 at a pivot joint 35. A rearward end of the carrier link 33 is pivotally connected to the operating head 27 at the movable hinge joint 28.

The second toggle assembly 40 is essentially identical to the first toggle assembly 30 but is mounted in reverse orientation, as shown in FIG. 4. The second toggle assembly 40 includes a carrier link 43 in addition to the control link 41. A first end of the control link 41 is pivotally connected to the mounting member 22 at the fixed hinge joint 24. A second or opposite end of the control link 41 is pivotally connected to the carrier link 43 at a pivot joint 45. A rearward end of the carrier link 43 is pivotally connected to the operating head 27 at the movable hinge joint 29.

It will be appreciated that the carrier link 33, 43 is fixed to, or integrated with, an inner surface of the associated brake panel 13, 14. As such, the carrier link 33, 43 may be integrally formed with the panel 13, 14, or may be separately formed and secured to the panel 13, 14 to form an integral structure.

The lengths of the control links 31, 41 and the carrier links 33, 43, and the position of the aerodynamic center AC on the brake panel 13, 14 is important for proper operation of the toggle assembly 30, 40, as will be described in detail hereinafter, and greatly reduces the force required to deploy and retract the panels 13, 14.

Figure 5A:
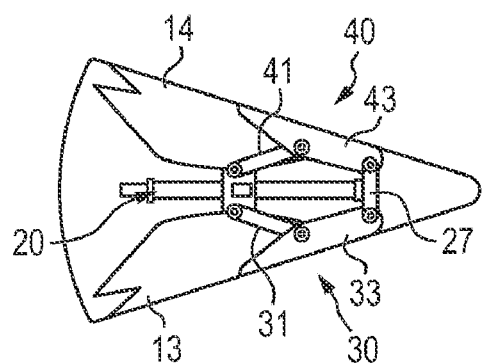
FIGS. 5A, 5B, and 5C are sequential plan views of the aft portion of the fuselage of the aircraft of the preceding views, illustrating the movement of the speed brake panels (and the operating mechanism) from a retracted position to an intermediate, or partially deployed position, and then to a fully deployed position.
Figure 5B:
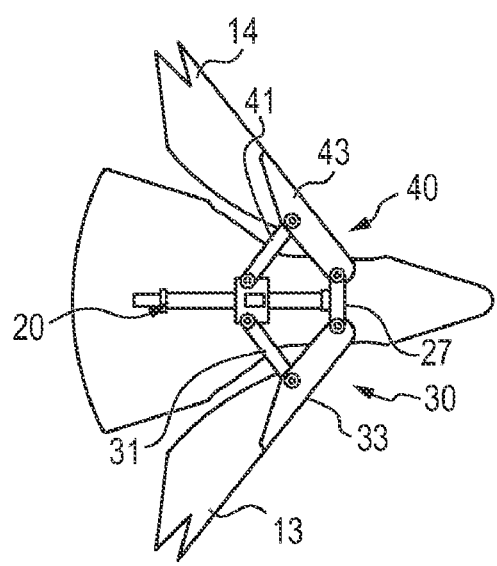
Figure 5C:
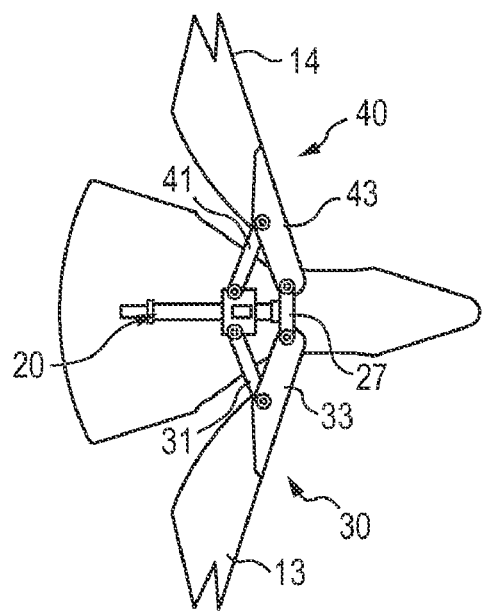

The brake panels 13, 14 are mounted on respective carrier links 33, 43 as best shown in FIGS. 3A-5C, so that when the operating head 27 is in its fully extended downstream position, as shown in FIGS. 4 and 5A, the toggle assemblies 30, 40 are extended and the brake panels 13, 14 are in their retracted positions so as to generally conform to the streamlined shape of the aft portion of the fuselage 11. As the piston 25 and piston rod 26 start to retract (move linearly forwardly), the operating head 27 moves correspondingly and causes the toggle assemblies 30, 40 to retract and project outwardly. This causes the brake panels 13, 14 to swing outwardly with their respective carrier links 33, 43, such that the pivot joints 35, 45 move outwardly through the openings 15, 16.

Figure 3B:
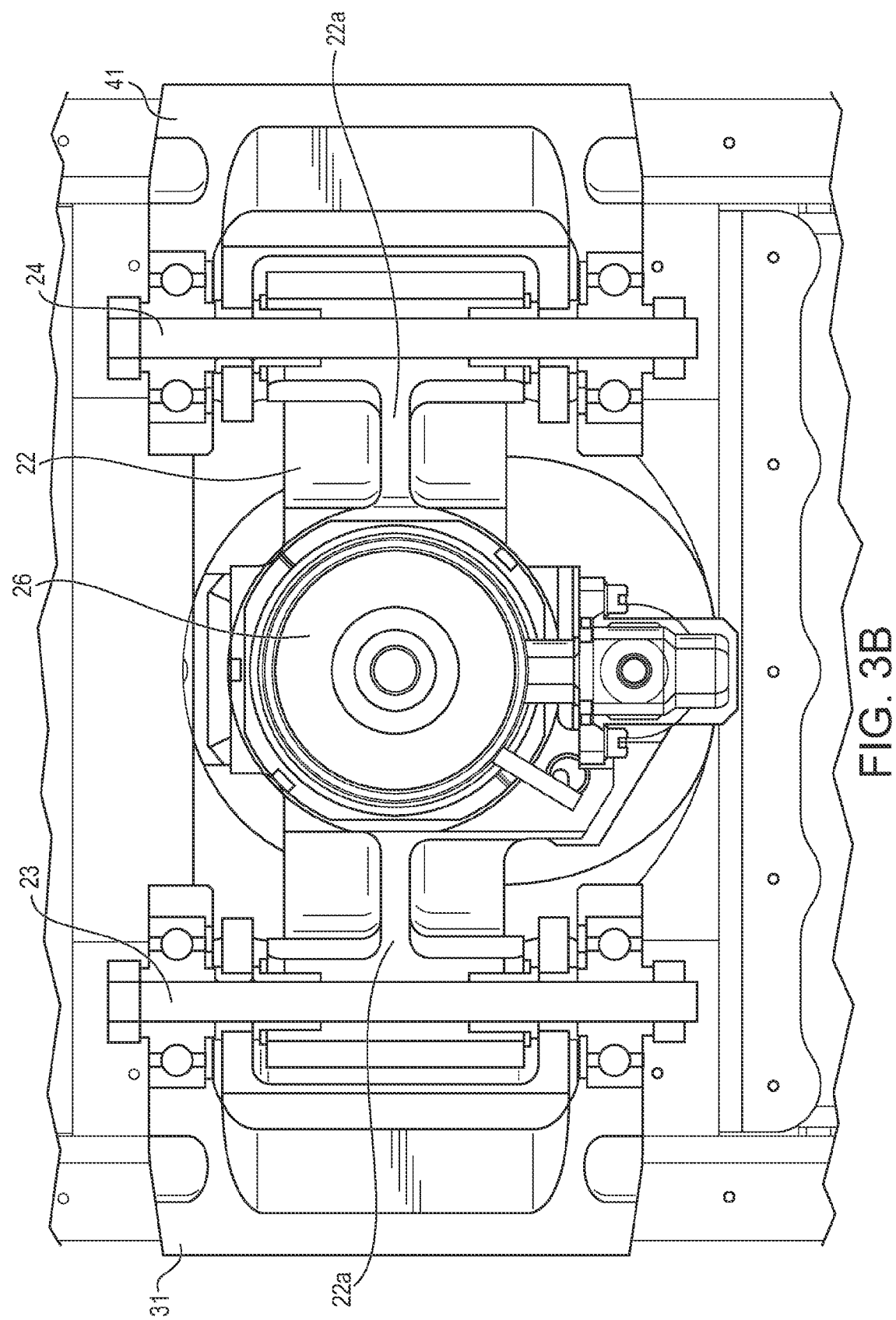
FIG. 3B is a front view of the aft fuselage portion of FIG. 3A showing a connection between a cylinder, a mounting member, and a control link.

The panels 13, 14 may be deployed to any desired extension up to the maximum deployment shown in FIG. 5C. During the deployment of the panels 13, 14, the outer or upstream ends of the panels 13, 14 and carrier links 33, 43, move outwardly through the openings 15, 16 while the downstream end portions of the panels 13, 14 move somewhat inwardly through the openings 15, 16, as shown in FIGS. 3, 5b and 5c.

The lengths of the links 31, 33; 41, 43 and the hinge joints and pivot joints 23, 24; 28, 29; 35, 45 defining connection points between the links, the operating head 27, and the support bracket and mounting structure 18, 22 are specially chosen so as to reduce the force required to move the panels 13, 14 between the deployed and retracted positions. More particularly, the panel 13, 14 has an aerodynamic center AC, which is known in the art and defines a location at which aerodynamic forces applied to the panel 13, 14 during normal operating conditions are balanced.

The position of the aerodynamic center AC is experimentally determined, and can be adjusted by altering the size and shape of the panel 13, 14. Therefore, in accordance with the present invention, the aerodynamic center AC is advantageously positioned so as to be at the intersection of a line that is a forward projection of the carrier link 33, 43 and a line that extends through the fixed hinge joint 23, 24 of the control link 31, 41 perpendicular to the actuator axis L. Further, the length of the carrier link 33, 43 (i.e., the distance between the pivot joint 35, 45 and the hinge joint 28, 29) is equal to the distance from the fixed hinge joint 23, 24 to the aerodynamic center AC, and is also equal to the distance between the fixed hinge joint 23, 24 and the pivot joint 35, 45 (i.e., the length of the control link 31, 41), and is further equal to the distance from the pivot joint 35, 45 to the aerodynamic center AC. By using these physical parameters, the aerodynamic center AC of the panels 13, 14 can be properly positioned so as to minimize the force required to deploy and retract the panels 13, 14, as described hereinafter.

When the piston 25 is retracted to move forwardly, the panel 13, 14 opens such that the aerodynamic center AC moves away from the axis L in a direction (arrow B) that is perpendicular to the piston motion (arrow A). Likewise, as the piston 25 is extended to move rearwardly, the aerodynamic center AC of the panel 13, 14 moves toward the axis L in a direction (arrow D) that is perpendicular to piston motion (arrow C).

In either case, since the movement of the panel aerodynamic center AC is perpendicular to the movement of the piston 25, the panels 13, 14 move with virtually no load on the piston 25. In other words, the panel movement exerts no load on the fluid cylinder 21. In this regard, it is "virtually no load" (ideally loadless), but it is noted that mechanical losses, load imbalances as a result of non-ideal air flow, and friction may exert forces that must be overcome, so in practice there is some small resistance to panel movement that must be overcome by the fluid cylinder. Nevertheless, the load is very small, and instead of a hydraulic cylinder or, alternatively an electric drive motor, it is contemplated that the panels 13, 14 could be opened with mechanical linkages, such as push/pull rods and cables that are well known in the art and conventionally used to move ailerons, elevators, and rudders. Thus, the linear actuator of the present invention is intended to encompass all devices known presently or later developed that could be used to move the operating head linearly within the fuselage 11 to open and close the speed brake panels 13, 14.

Figure 6:
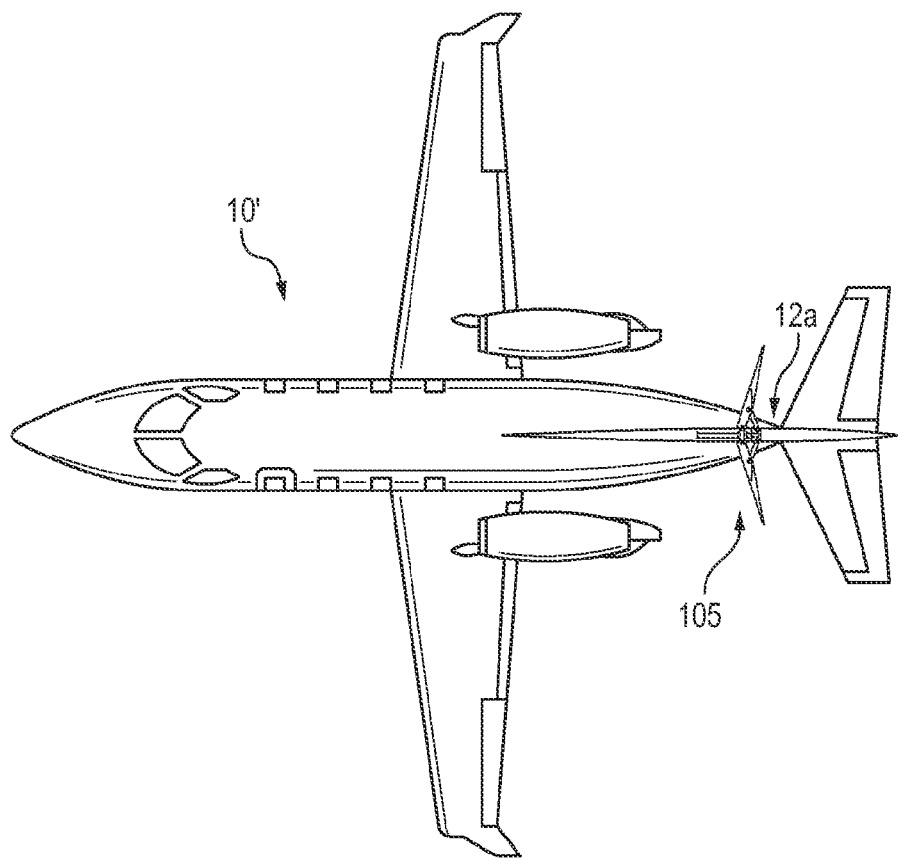
FIG. 6 schematically illustrates an aircraft with a speed brake according to another exemplary embodiment disposed on a tail cone thereof.
Figure 7:
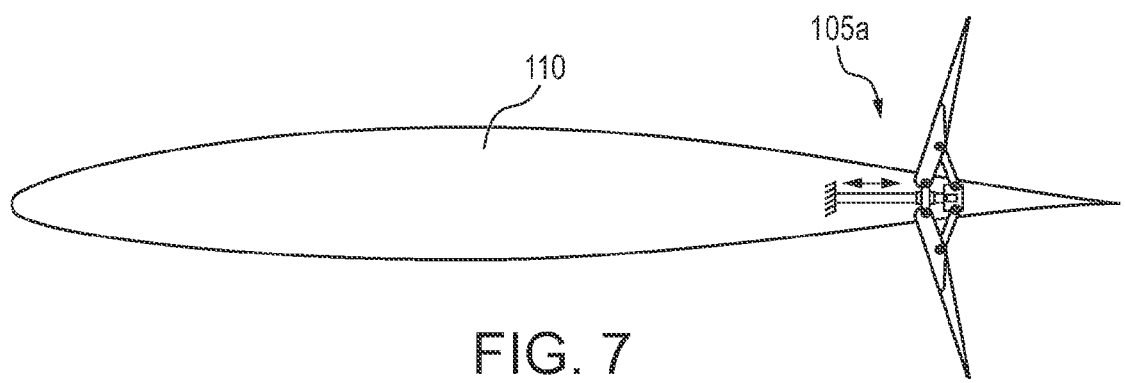
FIG. 7 schematically illustrates an aircraft wing according to another exemplary embodiment with a speed brake received therein.

It will be appreciated by those skilled in the art that a reduction of the force required to deploy and retract the panels 13, 14 is a great improvement in the art. It is further noted that those skilled in the art will recognize that the present invention is not limited to speed brakes disposed in the illustrated position on an aircraft. Rather, the present structure is amenable to various modifications. For example, with reference to FIG. 6, a similar speed brake arrangement 105 is shown on a tail cone 12a of an aircraft 10'. Further, and with reference to FIG. 7, a similar speed brake arrangement 105a is shown disposed on an aircraft wing 110. It is further noted that the speed brake arrangement could be disposed on or about a nose cone of an aircraft.

Thus, while the invention has been shown and described with respect to a specific embodiment thereof, this is intended for the purpose of illustration rather than limitation and other variations and modifications will be apparent to those skilled in the art, all within the intended spirit and scope of the invention. Accordingly, the patent is not to be limited in scope and effect to the specific device herein shown and described nor in any other way that is inconsistent with the spirit and scope of the invention.

What is claimed is:

1. A speed brake apparatus for reducing the airspeed of an aircraft by increasing aerodynamic drag, comprising:
   an operating head adapted for linear movement generally parallel to an axis of a fuselage of the aircraft,
   a pair of brake panels mounted on opposites sides of portion of the aircraft, the panels being operatively associated with the operating head so as to swing outwardly in opposite directions generally about their downstream end portions, between a retracted position, to a deployed position in which the panels project outward into the air stream, and
   a toggle mechanism associated with each brake panel and operatively connecting the associated brake panel to the operating head and a support structure such that linear movement of the operating head causes the panels to move between the retracted and deployed positions, said toggle mechanism including a control link and a carrier link, said control link being pivotally attached, at one end, to said support structure at a fixed joint and, at the other end, being pivotally secured to a first end of the carrier link at a pivot joint, said carrier link having a second end connected to the operating head at a hinge joint, wherein a first distance, extending from the fixed joint to the pivot joint, is generally equal to a second distance, extending from the pivot joint to the hinge joint, wherein the panel has an aerodynamic center, and wherein the aerodynamic center is disposed at an intersection of a line that is an extension of the carrier link and a line that extends through the fixed joint and perpendicular to the axis.

2. The speed brake apparatus as defined in claim 1, wherein each brake panel is mounted on one of the carrier links.

3. The speed brake apparatus as defined in claim 1, further comprising a linear actuator that is operatively coupled to the operating head and adapted to move the operating head linearly back and forth along the axis of the fuselage.

4. The speed brake as defined in claim 3, wherein the linear actuator includes a cylinder and piston, said cylinder being attached to the support structure and said piston including a piston rod, and wherein the operating head is at a free end of the piston rod.

5. The speed brake apparatus as defined in claim 1, wherein each brake panel is mounted on one of the carrier links.

6. The speed brake apparatus as defined in claim 1, wherein a third distance, extending from the pivot joint to the aerodynamic center of the panel, is generally equal to the first and second distances.

7. A speed brake apparatus for reducing the airspeed of an aircraft by increasing aerodynamic drag, comprising:
   an operating head located in the aircraft and adapted to move in a linear path,
   a pair of toggle assemblies, each toggle assembly including:
      a control link pivotally connected at one end to a supporting structure at a fixed joint, and
      a carrier link pivotally connected between the other end of the control linkage and the operating head,
   wherein the operating head has a rest position in which the links are relatively away from one another, and an actuated position in which the links are retracted toward one another;
   a linear actuator mounted adjacent the support structure and operatively connected to the operating head for moving the operating head linearly along an axis, and
   a pair of brake panels, each being mounted on a respective carrier link so as to swing between retracted positions in which the panels generally conform to a shape of adjacent portions of the aircraft and deployed positions in which the panels extend outwardly into the air stream to produce aerodynamic drag, wherein each of the panels has an aerodynamic center, and wherein the aerodynamic center is disposed at an intersection of a line that is an extension of the carrier link and a line that extends through the fixed joint and perpendicular to the axis.

8. The speed brake apparatus as defined in claim 7, wherein each control link has a first length and each carrier link has a second length, and wherein the first and second lengths are generally equal to one another.

9. The speed brake apparatus as defined in claim 8, wherein a third length, extending from an end of the carrier link to the aerodynamic center of the panel, is generally equal to the first and second lengths.

10. The speed brake apparatus as defined in claim 9, wherein as each of the panels is moved between the deployed and retracted positions, the aerodynamic center moves in a direction that is perpendicular to the axis.

11. The speed brake apparatus as defined in claim 10, wherein movement of each of the panels occurs without any load being placed on the linear actuator.

12. The speed brake apparatus as defined in claim 11, wherein the linear actuator is a hydraulic cylinder, and wherein the operating head is disposed on a piston rod that projects from the cylinder.

13. A speed brake apparatus for reducing the airspeed of an aircraft by increasing aerodynamic drag, comprising:
   an operating head adapted for linear movement generally parallel to an axis of a fuselage of the aircraft,
   a pair of brake panels mounted on opposites sides of portion of the aircraft, the panels being operatively associated with the operating head so as to swing outwardly in opposite directions generally about their downstream end portions, between a retracted position, to a deployed position in which the panels project outward, each panel having an aerodynamic center, a support structure fixed to the fuselage, control links associated with the brake panels, each control link being pivotally attached to the support structure at a fixed joint, and carrier links associated with the brake panels, each control link being pivotally secured to a respective control link at a pivot joint and to the operating head at a hinge joint, wherein the aerodynamic center for each panel is disposed at an intersection of a line that is an extension of the carrier link that is associated with the respective panel and a line that extends through the fixed joint and perpendicular to the axis.

14. The speed brake apparatus of claim 13, wherein each carrier link is fixed to or integrated with an inner surface of the panel.

15. The speed brake apparatus of claim 13, wherein each brake panel is mounted on one of the carrier links.

16. The speed brake apparatus of claim 13, wherein a distance along a respective control link from the fixed joint to the pivot joint is generally equal to a distance from the pivot joint to the aerodynamic center of the panel associated with the respective control link.

17. The speed brake apparatus of claim 13, wherein a distance along a respective carrier link from the pivot joint to the hinge joint is generally equal to a distance from the pivot joint to the aerodynamic center of the panel associated with the respective carrier link.

* * * * *